(12) United States Patent
Shan et al.

(10) Patent No.: US 11,644,433 B2
(45) Date of Patent: May 9, 2023

(54) IMPEDANCE SPECTRUM IN-SITU MEASUREMENT DEVICE AND METHOD FOR DIELECTRIC CONSTANT OF SOLID MATERIAL, AT HIGH TEMPERATURE AND HIGH PRESSURE CONDITIONS

(71) Applicant: Institute of Geochemistry, Chinese Academy of Sciences, Guiyang (CN)

(72) Inventors: Shuangming Shan, Guiyang (CN); Heping Li, Guiyang (CN)

(73) Assignee: Institute of Geochemistry, Chinese Academy of Scien, Guiyang (CN)

(*) Notice: Subject to any disclaimer, the term of this patent is extended or adjusted under 35 U.S.C. 154(b) by 0 days.

(21) Appl. No.: 17/577,744

(22) Filed: Jan. 18, 2022

(65) Prior Publication Data
US 2023/0076986 A1 Mar. 9, 2023

(30) Foreign Application Priority Data
Aug. 24, 2021 (CN) .......................... 202110972690.7

(51) Int. Cl.
*G01R 27/26* (2006.01)
*G01N 27/02* (2006.01)

(52) U.S. Cl.
CPC ......... *G01N 27/028* (2013.01); *G01N 27/026* (2013.01)

(58) Field of Classification Search
CPC ..................... G01N 27/028; G01N 27/026
See application file for complete search history.

(56) References Cited

U.S. PATENT DOCUMENTS

| 2016/0002506 A1* | 1/2016 | Mitamura | ............. G06F 3/0446 522/18 |
| 2017/0355173 A1* | 12/2017 | Tanaka | ................... B32B 27/30 |

OTHER PUBLICATIONS

Zhang Jinbiao, and Shao Fangwu, (Tianjin Institute of Technology, Tianjin), "Microwave Measurement of Complex Dielectric Constant", Journal of Electronics, vol. 5, No. 4, Oct. 1988, pp. 312-317.
(Continued)

*Primary Examiner* — Alesa Allgood
(74) *Attorney, Agent, or Firm* — Miles & Stockbridge P.C.

(57) ABSTRACT

The invention discloses an impedance spectrum in-situ measuring device for the dielectric constant of solid materials at high temperature and high pressure conditions. The device comprises a cube-shaped pyrophyllite, a cylindrical opening penetrates between one end face of the pyrophyllite and the other end face opposite to the end face; a heater formed by sleeving annular stainless steel sheets is arranged in the opening; a first plate-shaped platinum electrode and a second plate-shaped platinum electrode are arranged in the cavity of the innermost ring-shaped stainless steel sheet. The first plate-shaped platinum electrode is electrically connected with one end of the Solartron 1260 Impedance/Gainphase Analyzer through a first lead, and the second plate-shaped platinum electrode is electrically connected with the other end of the Solartron 1260 Impedance/Gainphase Analyzer through a second lead. Several layers of machinable alumina fillers are filled between the sample of the solid material to be measured and the innermost annular stainless steel sheet. The device also comprises a first cylindrical plug and a second cylindrical plug. The device can be considered as a useful tool in study on the properties of the dielectric constant of the solid material to be measured at high temperature and high pressure conditions.

8 Claims, 3 Drawing Sheets

(56) References Cited

OTHER PUBLICATIONS

Xie Hong-Sen, Zhang Yue-Ming, Xu Hui-Gang, Hou Wei, and Guo Jie, (Institute of Geochemistry, Academia Sinica, Guiyang 550002, PRC) and Zhao Hong-Ru (Department of Geophysics, Peking University, Beijing 100871, PRC), "A New Method of Measurement for Elastic Wave Velocities in Minerals and Rocks al High Temperature and High Pressure and Its Significance", Science in China (Series B), vol. 36 No. 10, Oct. 1993, pp. 1276-1280.

* cited by examiner

IMPEDANCE SPECTRUM IN-SITU MEASUREMENT DEVICE AND METHOD FOR DIELECTRIC CONSTANT OF SOLID MATERIAL, AT HIGH TEMPERATURE AND HIGH PRESSURE CONDITIONS

FIELD OF THE INVENTION

The invention relates to the technical field of electrical property measurement of dielectric materials, particularly to an impedance spectrum in-situ measurement device and method for the dielectric constant of solid materials at high temperature and high pressure conditions.

BACKGROUND OF THE INVENTION

As is well known in the art, the electrical properties of dielectric materials are one of the most important windows for people to understand the microstructure of substances, which are intrinsically related to the optical, electrical, thermal, rheological, diffusion and electromagnetic properties of substances. The quantitative relationship between the electrical properties of dielectric materials and external thermodynamic conditions at high temperature and high pressure conditions can provide a variety of constraints for people to solve the microstructure parameters of materials. For example, Quartz, which is one of the main rock-forming minerals in the crust, is a widely-used solid dielectric material. Therefore, it is necessary to provide a device and method by which the dielectric constant of solid materials can be measured in-situ at high temperature and high pressure conditions, so as to carry out experimental research on the dielectric constant properties of solid materials at high temperature and high pressure conditions.

SUMMARY OF THE INVENTION

The embodiment of this specification provides an impedance spectrum in-situ measurement device and method for the dielectric constant of solid materials at high temperature and high pressure conditions, so as to facilitate the experimental research on the dielectric constant properties of solid materials at high temperature and high pressure conditions.

On one hand, the invention provides an impedance spectrum in-situ measurement device for dielectric constant of solid materials at high temperature and high pressure conditions, which comprises:

a cube-shaped pyrophyllite, used as an external pressure medium;

a cylindrical opening penetrates between one end-face of the pyrophyllite and the other end-face opposite to the end-face; the cylindrical opening is internally provided with a heater formed by sleeving several annular stainless steel sheets with different diameters;

a first plate-shaped platinum electrode and a second plate-shaped platinum electrode, which are arranged in the cavity of the innermost ring-shaped stainless steel sheet; the first plate-shaped platinum electrode and the second plate-shaped platinum electrode are used for clamping a solid material to be measured; the first plate-shaped platinum electrode is electrically connected with one end of an Solartron 1260 Impedance/Gainphase Analyzer through a first lead, and the second plate-shaped platinum electrode is electrically connected with the other end of the Solartron 1260 Impedance/Gainphase Analyzer through a second lead;

a plurality of layers of machinable alumina fillers are filled between the solid material to be measured and the innermost ring-shaped stainless steel sheet, the machinable alumina fillers are used as internal pressure medium, a metal film is arranged in the machinable alumina fillers, and the metal film is electrically connected with a grounding wire;

a first cylindrical plug and a second cylindrical plug; the first cylindrical plug is used for sealing one end of the cylindrical opening, and the second cylindrical plug is used for sealing the other end of the cylindrical opening.

Preferably, the cube-shaped pyrophyllite is sintered in advance, wherein the sintering temperature is 973 K and the sintering time is 8 ~10 h.

Preferably, the device further comprises a first insulating sleeve and a second insulating sleeve, wherein the first lead is inserted into the threading hole of the first insulating sleeve and the second lead is inserted into the threading hole of the second insulating sleeve; The first lead and the second lead are both made of nickel metal.

Preferably, the device further comprises a thermocouple, one end of which is in contact with the solid material to be measured, and the other end of which is exposed to the environment.

On the other hand, the invention provides an impedance spectrum in-situ measurement method of dielectric constant of solid materials at high temperature and high pressure conditions, which comprises the following steps:

S1, preparing several solid materials to be measured in cylindrical shapes with different heights in advance, wherein two top surfaces of the solid materials to be measured are polished by diamond sandpaper with 1000 meshes;

S2, cleaning the solid material to be detected in absolute ethyl alcohol by using an ultrasonic cleaning machine;

S3, drying the cleaned solid material to be measured;

S4, respectively assembling the dried solid materials to be measured in an impedance spectrum in-situ measuring device and performing a high temperature and high pressure test;

in the test process, firstly, the pressure is raised to a predetermined pressure at a boosting rate of 0.5 GPa/h , then the temperature is automatically raised at a heating rate of 20° C./min, and the temperature is stabilized for 15~20 minutes after reaching a predetermined value, and then the impedance spectrum data of the solid material to be tested is measured and recorded by an Solartron 1260 Impedance/Gainphase Analyzer for multiple times in a frequency range;

S5, performing equivalent circuit fitting on the impedance spectrum data to obtain a capacitance value $C_1$; calculating the apparent measured dielectric constant $\varepsilon_M$ of the solid material to be measured based on the capacitance value $C_1$;

S6, performing edge effect correction on the apparent measured dielectric constant $\varepsilon_m$ to obtain the final measured dielectric constant $\varepsilon$ of the solid material to be measured.

Preferably, the diameter of the cylindrical solid material to be measured is 6 mm, and the heights are 1 mm, 2 mm, 3 mm and 4 mm respectively.

Preferably, in step S6, correction for edge effect is performed on the apparent measured dielectric constant by using the following formula to finally obtain the final measured dielectric constant $\varepsilon$ of the solid material to be measured;

$$\varepsilon = a \times \exp\left(-\frac{D/d}{b}\right) + \varepsilon_M^{20}$$

where D represents the electrode diameter, d represents the distance between two electrodes of the electrode diameter, a represents the preset first fitting parameter and b represents the preset second fitting parameter.

Preferably, the numerical range of the predetermined pressure in step S4 is between 0.5-4.0 GPa.

Compared with the prior art, the present invention has the following advantages and positive effects:

The invention provides an impedance spectrum in-situ measurement device and method for the dielectric constant of solid materials at high temperature and high pressure conditions. By using the device provided by the invention, the properties of the dielectric constant of solid materials can be studied at high temperature and high pressure conditions, thus opening up a new way for studying the dielectric constant of solid materials at high temperature and high pressure conditions.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE INVENTION

In order to make the purpose, technical scheme and advantages of this application clearer, the technical scheme of this application will be described clearly and completely with reference to specific embodiments of this application and corresponding drawings. Obviously, the described embodiments are only a part of the embodiments of this application, but not all the embodiments. Based on the embodiments in this specification, all other embodiments obtained by ordinary technicians in the field without creative labor belong to the protection scope of this application.

Figure 1:
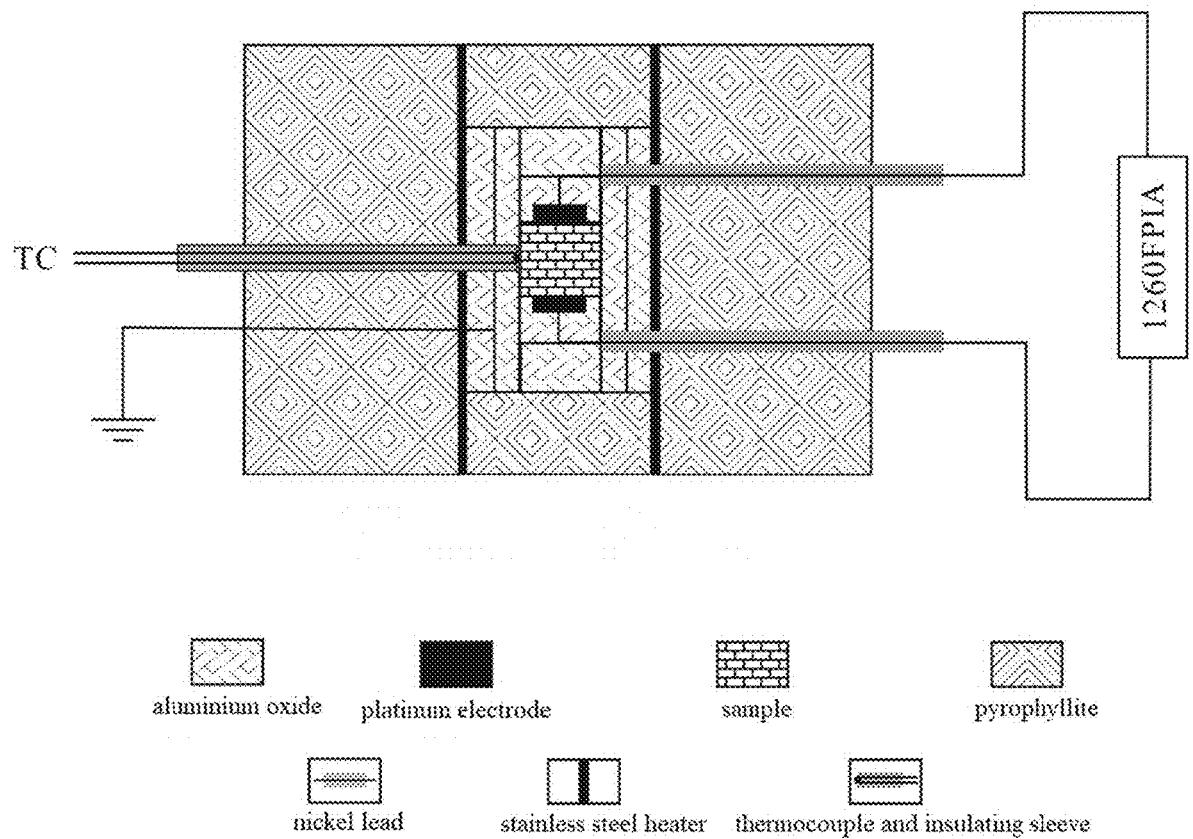
FIG.1 is a cross-sectional view of an impedance spectrum in-situ measurement device for dielectric constant of solid materials at high temperature and high pressure conditions provided by an embodiment of this specification.
Figure 2:
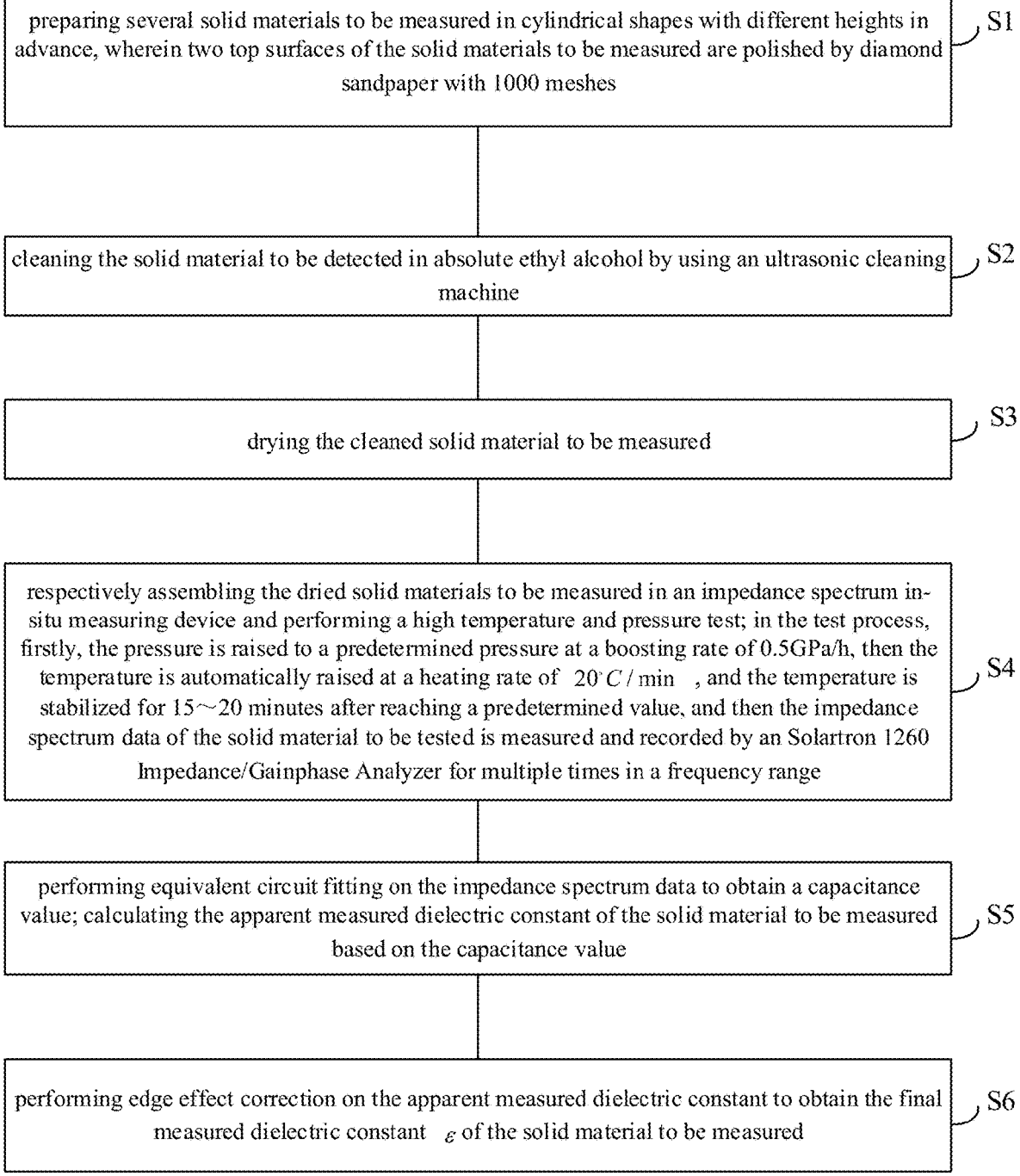
FIG.2 is a schematic flowchart of the impedance spectrum in-situ measurement method of dielectric constant of solid materials at high temperature and high pressure conditions provided by the embodiment of this specification.

The embodiment of this specification provides an impedance spectrum in-situ measurement device for dielectric constant of solid materials at high temperature and high pressure conditions. As shown in FIG.1, the measurement device includes: a cube-shaped pyrophyllite which is used as an external pressure medium, a cylindrical opening is formed through one end face of the pyrophyllite and the other end face opposite to the end face, this cylindrical opening can be made by machining. A heater formed by sleeving a plurality of annular stainless steel sheets with different diameters is arranged in the cylindrical opening, and the number of layers of the stainless steel sheets in the technical scheme of this embodiment is 3. Among the three layers of stainless steel sheets, a first plate-shaped platinum electrode and a second plate-shaped platinum electrode are arranged in the cavity of the innermost ring-shaped stainless steel sheet, and the first plate-shaped platinum electrode and the second plate-shaped platinum electrode are oppositely arranged for clamping the solid material to be measured. The first plate-shaped platinum electrode is electrically connected with one end of the Solartron 1260 Impedance/Gainphase Analyzer through a first lead, and the second plate-shaped platinum electrode is electrically connected with the other end of the Solartron 1260 Impedance/Gainphase Analyzer through a second lead.

A machinable alumina filler is filled between the solid material to be measured and the innermost annular stainless steel sheet, and the machinable alumina filler is used as an internal pressure medium. A metal film is arranged in the machinable alumina filler, and the metal film is electrically connected with a grounding wire.

The impedance spectrum in-situ measurement device for the dielectric constant of solid materials provided by the embodiment of the invention further comprises a first cylindrical plug and a second cylindrical plug, wherein the first cylindrical plug is used for sealing one end of the cylindrical opening and the second cylindrical plug is used for sealing the other end of the cylindrical opening. Therefore, during the test, the solid material to be tested as a test sample can be sealed in a closed space by the sealing action of the first cylindrical plug and the second cylindrical plug, so that the impedance spectrum of the dielectric constant of the solid material can be measured in situ at high temperature and high pressure conditions.

In an alternative embodiment technical scheme, the cube-shaped pyrophyllite is sintered in advance, wherein the sintering temperature is 973 K and the sintering time is 8~10 h.

In an alternative embodiment technical scheme, it also comprises a first insulating sleeve and a second insulating sleeve, wherein the first lead is inserted into the threading hole of the first insulating sleeve and the second lead is inserted into the threading hole of the second insulating sleeve. The first lead and the second lead are both made of nickel metal.

By using the device of the invention, the impedance spectrum of the dielectric constant of solid materials can be measured in situ at high temperature and high pressure conditions, including the following contents:

S1, preparing several solid materials to be measured in cylindrical shapes with different heights in advance, wherein two top surfaces of the solid materials to be measured are polished by diamond sandpaper with 1000 meshes;

S2, cleaning the solid material to be detected in absolute ethyl alcohol by using an ultrasonic cleaning machine;

S3, drying the cleaned solid material to be measured;

S4, respectively assembling the dried solid materials to be measured in an impedance spectrum in-situ measuring device and performing a high temperature and pressure test; in the test process, firstly, the pressure is raised to a predetermined pressure at a boosting rate of 0.5 GPa/h, then the temperature is automatically raised at a heating rate of 20° C./min, and the temperature is stabilized for 15~20 minutes after reaching a predetermined value, and then the impedance spectrum data of the solid material to be tested is measured and recorded by an Solartron 1260 Impedance/Gainphase Analyzer for multiple times in a frequency range;

S5, performing equivalent circuit fitting on the impedance spectrum data to obtain a capacitance value; calculating the apparent measured dielectric constant of the solid material to be measured based on the capacitance value;

S6, performing edge effect correction on the apparent measured dielectric constant to obtain the final measured dielectric constant ε of the solid material to be measured.

According to the further optimization scheme, the diameter of the cylindrical solid material sample is 6 mm, and the heights are 1 mm, 2 mm, 3 mm and 4 mm respectively.

Further optimizing the scheme, the numerical range of the predetermined pressure in step S4 is 0.5-4.0 GPa, and the fluctuation range of the temperature should be controlled within ±2° C., so that more accurate impedance spectrum data of the solid material to be tested can be obtained under stable test conditions, and the influence of test errors on the final test results can be effectively controlled.

Figure 3:
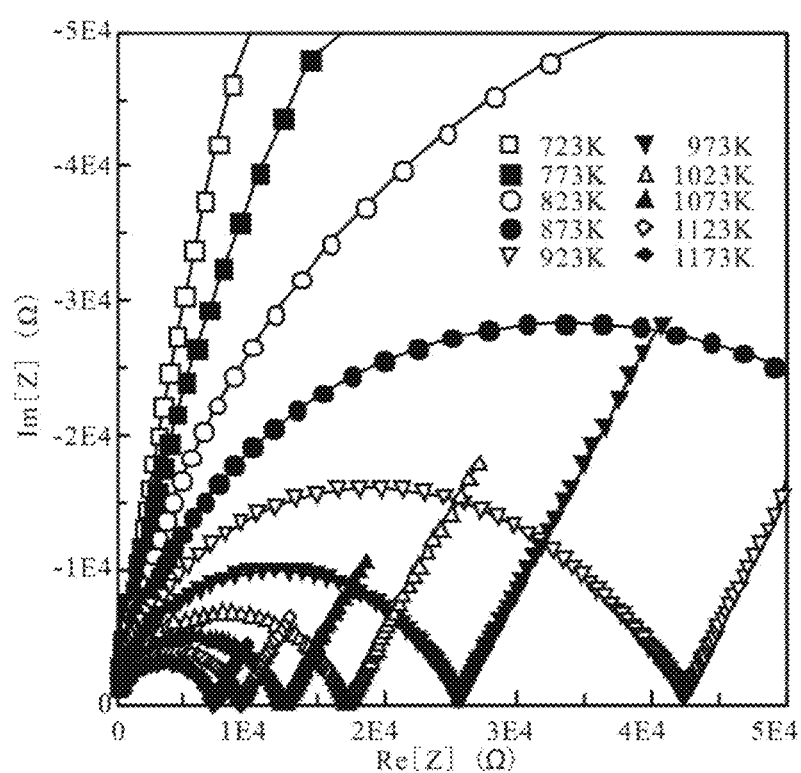
FIG.3 is an impedance spectrogram obtained by in-situ measurement of the dielectric constant of a Quartz sample at high temperature and high pressure conditions provided by an embodiment of this specification.

Specifically, the impedance spectrum of the dielectric constant of the Quartz sample can be measured in situ by using the device provided by the invention, and the impedance spectrum of the impedance spectrum of the dielectric constant of the Quartz sample in situ as shown in FIG.3 can be obtained. Equivalent circuit fitting of impedance spectrum data can obtain the fitting results shown in Table 1. The apparent measured dielectric constant $\varepsilon_M$ shown in Table 2 can be obtained based on the capacitance values listed in Table 1.

$$\varepsilon = a \times \exp\left(-\frac{D/d}{b}\right) + \varepsilon_M^5$$

where D represents the electrode diameter, d represents the distance between two electrodes of the electrode diameter, a represents the preset first fitting parameter and b represents the preset second fitting parameter.

TABLE 3

Final measured dielectric constants ε at different temperatures under 2.0 GPa pressure.

| T | a | b | ε | $r^2$ |
|---|---|---|---|---|
| 723K | 4800.72285 | 0.97876 | 475.349 | 0.9984 |
| 773K | 4845.13254 | 0.96342 | 474.163 | 0.9980 |
| 823K | 4788.40765 | 0.96452 | 470.690 | 0.9979 |
| 873K | 4913.15806 | 0.94629 | 471.699 | 0.9977 |
| 923K | 4009.15328 | 1.06997 | 450.817 | 0.9996 |
| 973K | 4004.55584 | 1.06370 | 454.952 | 0.9994 |
| 1023K | 3997.96608 | 1.06187 | 459.261 | 0.9995 |
| 1073K | 3976.81284 | 1.06732 | 464.078 | 0.9998 |
| 1123K | 3962.24228 | 1.06464 | 471.962 | 0.9998 |
| 1173K | 3979.43503 | 1.05859 | 479.453 | 0.9998 |

TABLE 1

Fitting results of impedance spectrum equivalent circuit of each Quartz sample

| | 4 mm | | 3 mm | | 2 mm | | 1 mm | |
|---|---|---|---|---|---|---|---|---|
| T(K) | C (F) | δ % | C (F) | δ % | C (F) | δ % | C (F) | δ % |
| 723 | 7.686E−11 | 0.601 | 7.397E−11 | 0.652 | 7.393E−11 | 0.718 | 7.945E−11 | 1.026 |
| 773 | 7.626E−11 | 0.525 | 7.291E−11 | 0.594 | 7.306E−11 | 0.629 | 7.872E−11 | 0.994 |
| 823 | 7.555E−11 | 0.449 | 7.221E−11 | 0.539 | 7.252E−11 | 0.585 | 7.813E−11 | 0.977 |
| 873 | 7.568E−11 | 0.410 | 7.189E−11 | 0.496 | 7.201E−11 | 0.544 | 7.782E−11 | 0.958 |
| 923 | 7.153E−11 | 0.474 | 7.155E−11 | 0.452 | 7.179E−11 | 0.509 | 7.785E−11 | 0.955 |
| 973 | 7.134E−11 | 0.434 | 7.112E−11 | 0.422 | 7.182E−11 | 0.478 | 7.819E−11 | 1.009 |
| 1023 | 7.131E−11 | 0.411 | 7.121E−11 | 0.424 | 7.192E−11 | 0.470 | 7.882E−11 | 1.040 |
| 1073 | 7.135E−11 | 0.401 | 7.183E−11 | 0.417 | 7.209E−11 | 0.489 | 7.989E−11 | 1.168 |
| 1123 | 7.141E−11 | 0.395 | 7.199E−11 | 0.398 | 7.245E−11 | 0.500 | 8.102E−11 | 1.253 |
| 1173 | 7.161E−11 | 0.394 | 7.217E−11 | 0.408 | 7.278E−11 | 0.581 | 8.203E−11 | 1.258 |

TABLE 2

Apparent measured dielectric constants $\varepsilon_M$ of samples with different lengths at high temperature and high pressure conditions.

| | 4 mm | 3 mm | 2 mm | 1 mm |
|---|---|---|---|---|
| D/d | 1.222 | 1.605 | 2.366 | 4.696 |
| 723K | 1866.245 | 1377.073 | 926.991 | 508.128 |
| 773K | 1851.651 | 1357.284 | 916.083 | 503.491 |
| 823K | 1834.387 | 1344.308 | 909.275 | 499.686 |
| 873K | 1837.617 | 1338.351 | 902.855 | 497.729 |
| 923K | 1736.752 | 1331.984 | 900.159 | 497.914 |
| 973K | 1732.236 | 1324.072 | 900.510 | 500.063 |
| 1023K | 1731.483 | 1325.655 | 901.689 | 504.125 |
| 1073K | 1732.430 | 1337.290 | 903.921 | 510.936 |
| 1123K | 1733.862 | 1340.120 | 908.334 | 518.208 |
| 1173K | 1738.670 | 1343.601 | 912.472 | 524.636 |

It should be noted that due to the existence of edge effect, the apparent measured dielectric constant $\varepsilon_M$ can not fully reflect the dielectric constant of the sample itself, but must be corrected for edge effect. The technical scheme of the embodiment of the invention provides a further optimization scheme. In step S6, the following formula is adopted to carry out edge effect correction on the apparent measured dielectric constant $\varepsilon_M$, and finally the final measured dielectric constant ε of the Quartz sample is obtained:

The invention provides an impedance spectrum in-situ measurement device and method for the dielectric constant of solid materials at high temperature and high pressure conditions. By using the device provided by the invention, the properties of the dielectric constant of solid materials can be studied at high temperature and high pressure conditions, thus opening up a new way for studying the dielectric constant of solid materials at high temperature and high pressure conditions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An impedance spectrum in-situ measurement device for dielectric constant of solid materials at high temperature and high pressure conditions, characterized by comprising:

a cube-shaped pyrophyllite, used as an external pressure medium;

a cylindrical opening penetrates between one end-face of the pyrophyllite and the other end-face opposite to the end-face; the cylindrical opening is internally provided with a heater formed by sleeving several annular stainless steel sheets with different diameters;

a first plate-shaped platinum electrode and a second plate-shaped platinum electrode, which are arranged in the cavity of the innermost ring-shaped stainless steel sheet; the first plate-shaped platinum electrode and the second plate-shaped platinum electrode are used for clamping a solid material to be measured;

the first plate-shaped platinum electrode is electrically connected with one end of an Solartron 1260 Impedance/Gainphase Analyzer through a first lead, and the second plate-shaped platinum electrode is electrically connected with the other end of the Solartron 1260 Impedance/Gainphase Analyzer through a second lead;

a plurality of layers of machinable alumina fillers are filled between the solid material to be measured and the innermost ring-shaped stainless steel sheet, the machinable alumina fillers are used as internal pressure medium, a metal film is arranged in the machinable alumina fillers, and the metal film is electrically connected with a grounding wire;

a first cylindrical plug and a second cylindrical plug; the first cylindrical plug is used for sealing one end of the cylindrical opening, and the second cylindrical plug is used for sealing the other end of the cylindrical opening.

2. The device according to claim 1, wherein the cube-shaped pyrophyllite is sintered in advance, wherein the sintering temperature is 973 K and the sintering time is 8~10 h.

3. The device according to claim 1, further comprising a first insulating sleeve and a second insulating sleeve, wherein the first lead is inserted into the threading hole of the first insulating sleeve and the second lead is inserted into the threading hole of the second insulating sleeve; the first lead and the second lead are both made of nickel metal.

4. The device according to claim 1, further comprising a thermocouple, one end of which is in contact with the solid material to be measured, and the other end of which is exposed to the environment.

5. An impedance spectrum in-situ measurement method of dielectric constant of solid materials at high temperature and high pressure conditions, characterized by comprising the following steps:

S1, preparing several solid materials to be measured in cylindrical shapes with different heights in advance, wherein two top surfaces of the solid materials to be measured are polished by diamond sandpaper with 1000 meshes;

S2, cleaning the solid material to be detected in absolute ethyl alcohol by using an ultrasonic cleaning machine;

S3, drying the cleaned solid material to be measured;

S4, respectively assembling the dried solid materials to be measured in an impedance spectrum in-situ measuring device and performing a high-temperature and high-pressure test;

in the test process, firstly, the pressure is raised to a predetermined pressure at a boosting rate of 0.5 GPa/h, then the temperature is automatically raised at a heating rate of 20° C./min, and the temperature is stabilized for 15~20 minutes after reaching a predetermined value, and then the impedance spectrum data of the solid material to be tested is measured and recorded by an Solartron 1260 Impedance/Gainphase Analyzer for multiple times in a frequency range;

S5, performing equivalent circuit fitting on the impedance spectrum data to obtain a capacitance value $C_1$; calculating the apparent measured dielectric constant $\varepsilon_M$ of the solid material to be measured based on the capacitance value $C_1$;

S6, performing edge effect correction on the apparent measured dielectric constant $\varepsilon_M$ to obtain the final measured dielectric constant $\varepsilon$ of the solid material to be measured.

6. The method according to claim 5, wherein the diameter of the cylindrical solid material to be measured is 6 mm, and the heights are 1 mm, 2 mm, 3 mm and 4 mm respectively.

7. The method according to claim 5, wherein in step S6, correction for edge effect is performed on the apparent measured dielectric constant by using the following formula to finally obtain the final measured dielectric constant $\varepsilon$ of the solid material to be measured;

$$\varepsilon = a \times \exp\left(-\frac{D/d}{b}\right) + E_M$$

where D represents the electrode diameter, d represents the distance between two electrodes of the electrode diameter, a represents the preset first fitting parameter and b represents the preset second fitting parameter.

8. The method according to claim 5, wherein the numerical range of the predetermined pressure in step S4 is between 0.5~4.0 GPa.

* * * * *